(12) United States Patent
Konchenko et al.

(10) Patent No.: US 11,598,639 B2
(45) Date of Patent: *Mar. 7, 2023

(54) SYSTEM FOR OFFSITE NAVIGATION

(71) Applicant: Schlumberger Technology Corporation, Sugar Land, TX (US)

(72) Inventors: Andrey Konchenko, Menlo Park, CA (US); Torbjoern Vik, Oslo (NO); Vincent Dury, Houston, TX (US); Dmitriy Monakhov, Richmond, TX (US); Ivan Alaniz, McAllen, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/878,524

(22) Filed: May 19, 2020

(65) Prior Publication Data

US 2020/0370901 A1  Nov. 26, 2020

Related U.S. Application Data

(60) Provisional application No. 62/850,482, filed on May 20, 2019.

(51) Int. Cl.
*G01C 21/34* (2006.01)
*G01C 21/32* (2006.01)
*G01C 21/00* (2006.01)

(52) U.S. Cl.
CPC ......... *G01C 21/3446* (2013.01); *G01C 21/32* (2013.01); *G01C 21/3453* (2013.01); *G01C 21/3819* (2020.08); *G01C 21/3822* (2020.08); *G01C 21/3841* (2020.08)

(58) Field of Classification Search
CPC ............... G01C 21/00; G01C 21/3423; G01C 21/3446; G01C 21/32; G01C 21/3453; G01C 21/3819; G01C 21/3822; G01C 21/3841; G01C 21/3815; G01C 21/20; G06Q 10/047; G06Q 50/28–32
USPC .................................................. 701/400–541
See application file for complete search history.

(56) References Cited

U.S. PATENT DOCUMENTS

| | | | |
|---|---|---|---|
| 6,456,933 B1* | 9/2002 | Hessing | G08G 1/096861 701/533 |
| 7,043,357 B1* | 5/2006 | Stankoulov | G01C 21/26 701/423 |
| 8,531,312 B2 | 9/2013 | Gueziec | |
| 8,600,098 B2 | 12/2013 | Diaz et al. | |
| 8,612,136 B2 | 12/2013 | Levine et al. | |
| 2001/0002454 A1* | 5/2001 | Narumi | G01C 21/26 701/400 |

(Continued)

*Primary Examiner* — Jeffrey C Boomer
*Assistant Examiner* — Paul Allen
(74) *Attorney, Agent, or Firm* — Michael Guthrie

(57) ABSTRACT

A navigation service generates a route for navigating from a route origin to a route destination using a private roads repository. A ghost road is along the route, and a ghost origin and a ghost destination of the ghost road is identified. Using an application programming interface of a base roads engine, a request for a route is sent from the ghost origin to the ghost destination. From the base roads engine and in response to the request, a replacement section from the ghost origin to the ghost destination is received. The ghost road is replaced with the replacement section to create an updated route, which is presented.

15 Claims, 9 Drawing Sheets

(56) References Cited

U.S. PATENT DOCUMENTS

| | | | |
|---|---|---|---|
| 2008/0071471 A1* | 3/2008 | Sumizawa | G01C 21/3667 701/414 |
| 2008/0201070 A1* | 8/2008 | Kikuchi | G01C 21/3647 701/533 |
| 2009/0048776 A1* | 2/2009 | Bouillet | G01C 21/3446 701/414 |
| 2011/0153190 A1* | 6/2011 | Rolinski | G01C 21/206 701/533 |
| 2013/0204528 A1* | 8/2013 | Okude | G01C 21/3492 701/533 |
| 2014/0257697 A1* | 9/2014 | Gishen | G01C 21/3423 701/537 |
| 2015/0106010 A1 | 4/2015 | Martin et al. | |
| 2015/0179069 A1* | 6/2015 | Cazanas | G08G 1/096758 340/905 |
| 2015/0253142 A1* | 9/2015 | Kornhauser | G01C 21/3415 701/522 |
| 2016/0146617 A1* | 5/2016 | MacFarlane | H04W 4/029 701/532 |
| 2016/0161263 A1* | 6/2016 | Patel | G01C 21/3446 701/408 |
| 2017/0277578 A1* | 9/2017 | Greenwood | G06F 8/38 |
| 2018/0087917 A1* | 3/2018 | Adachi | G01C 21/3691 |
| 2018/0188063 A1* | 7/2018 | Thommen | G01C 21/3461 |
| 2019/0016341 A1* | 1/2019 | Nelson | B60W 40/06 |
| 2019/0180612 A1* | 6/2019 | Demiryurek | G01C 21/20 |
| 2019/0234743 A1* | 8/2019 | Roy | H04W 4/20 |
| 2020/0292344 A1* | 9/2020 | Hori | G01C 21/3423 |
| 2020/0318979 A1* | 10/2020 | Gonopolskiy | G01C 21/3446 |
| 2020/0327707 A1* | 10/2020 | Furger | G01C 21/32 |

* cited by examiner

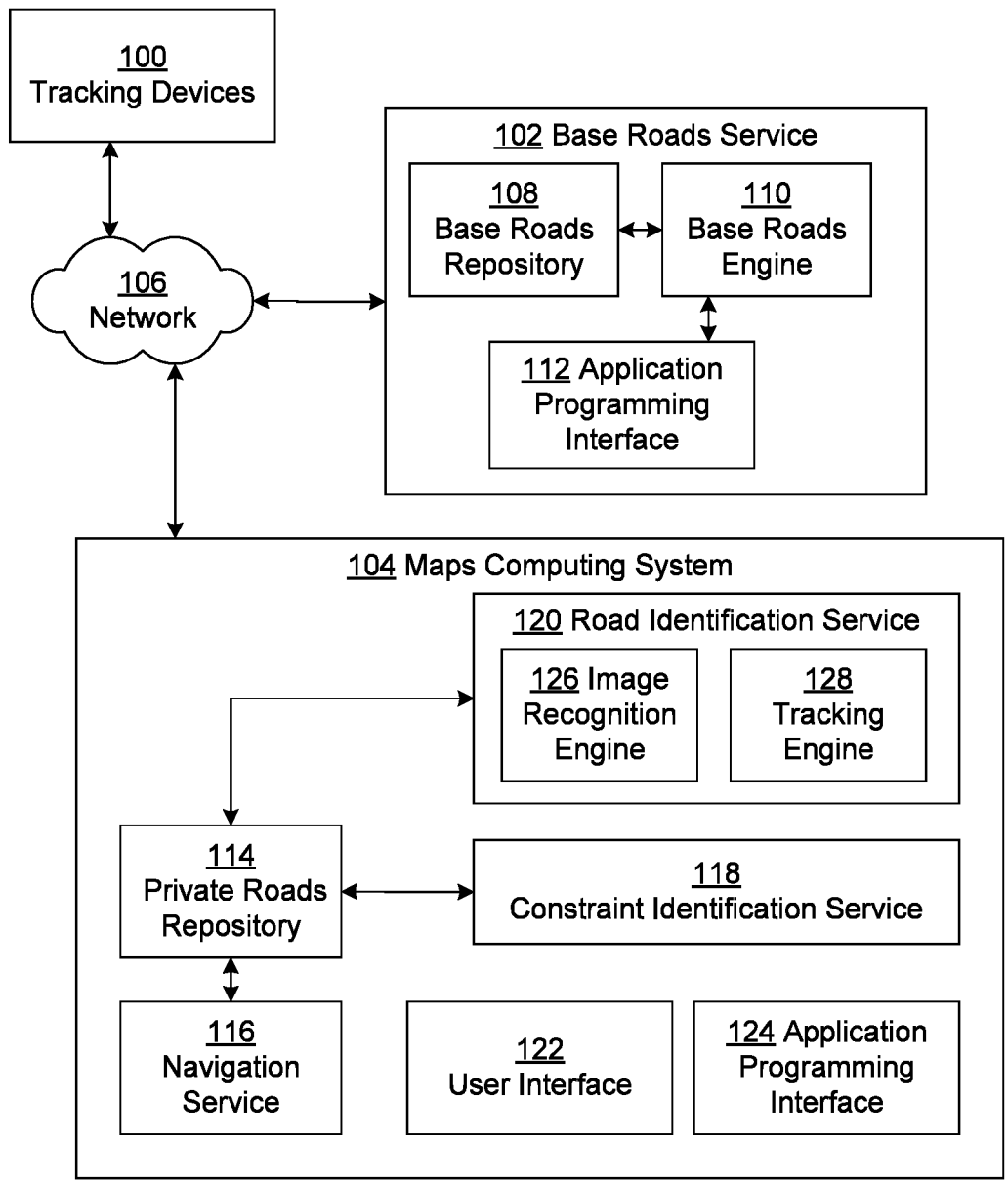
FIG. 1.1

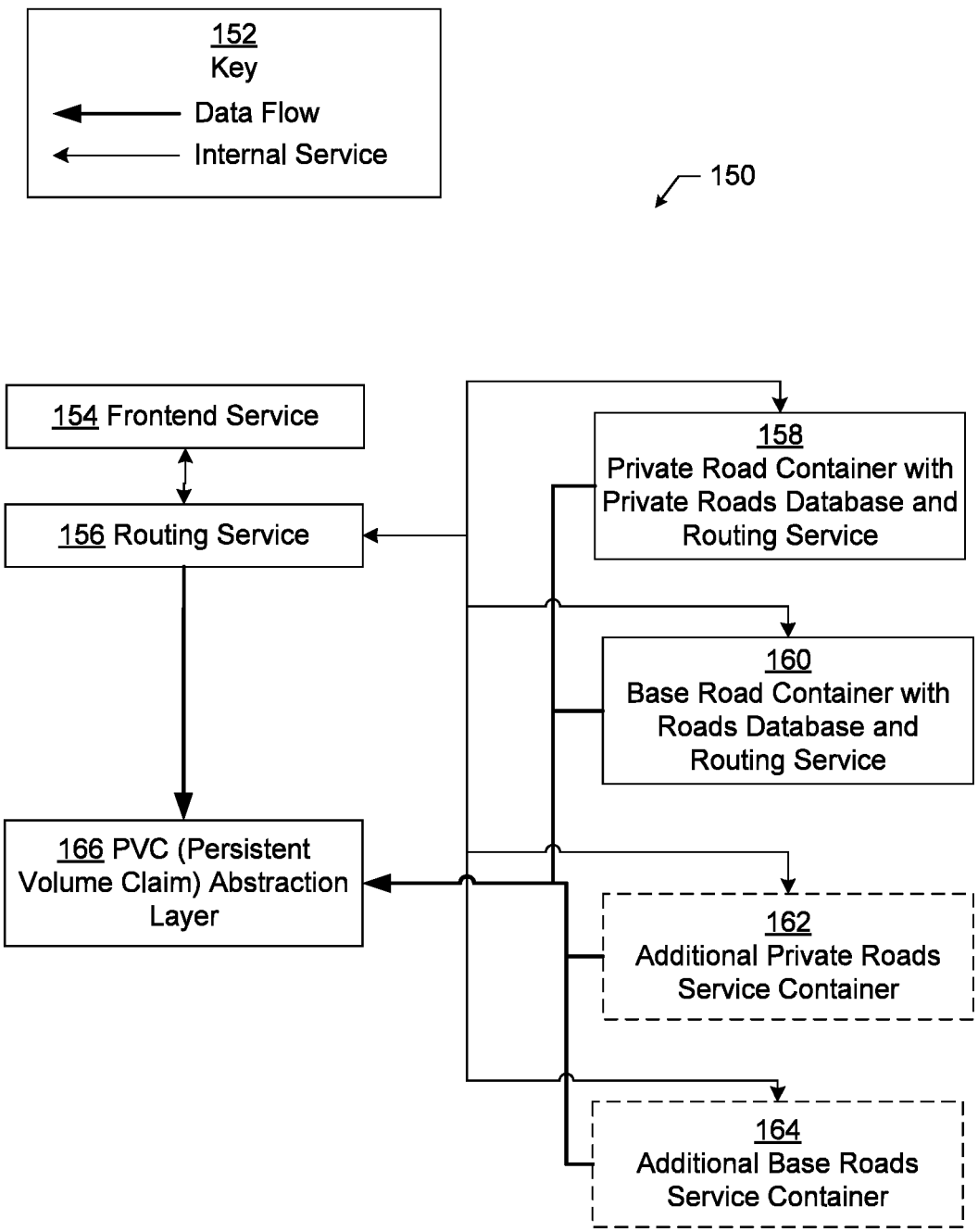
FIG. 1.2

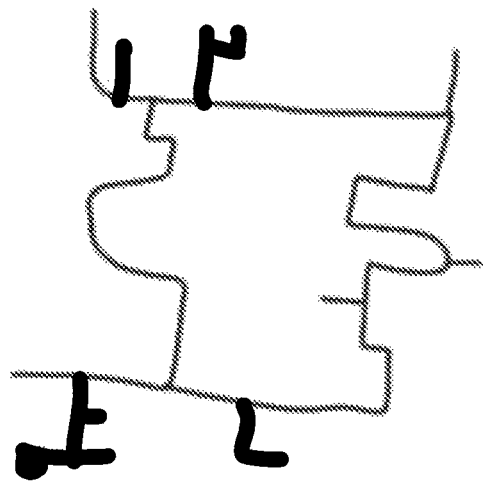
*FIG. 6.1*
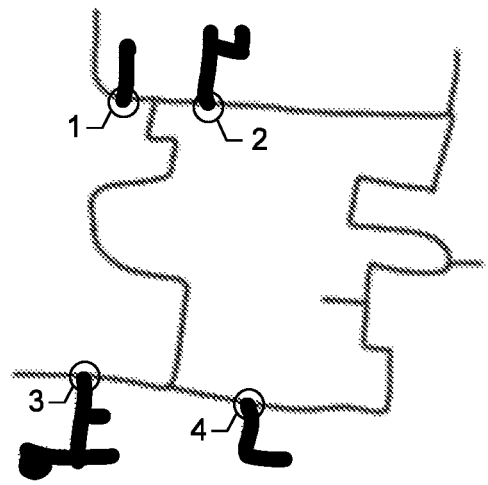
*FIG. 6.2*
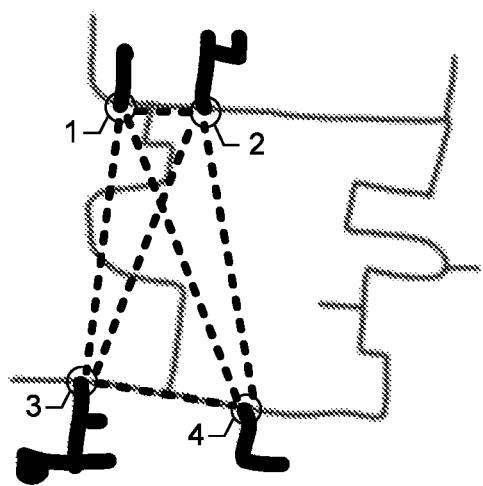
*FIG. 6.3*
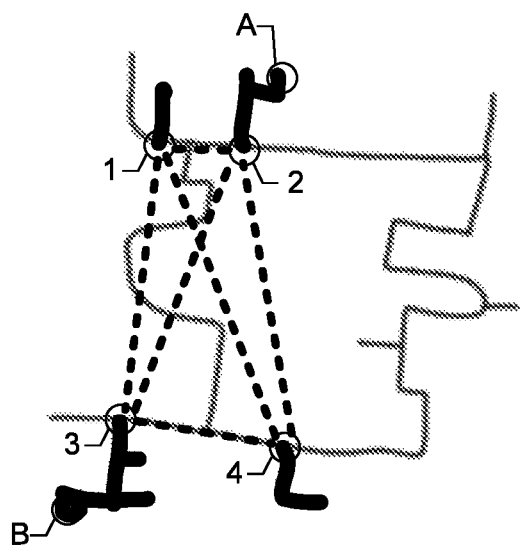
*FIG. 6.4*

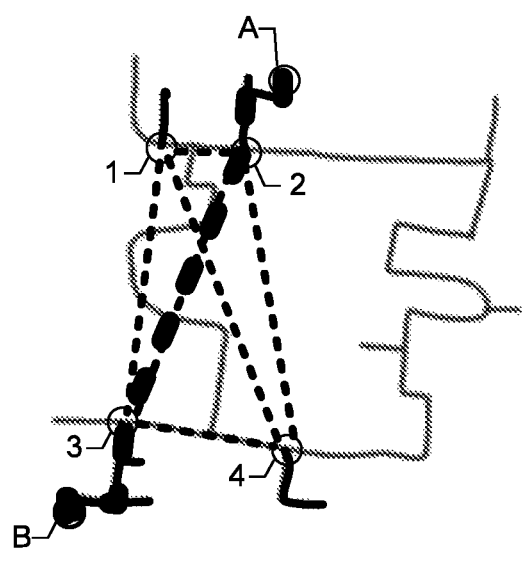
*FIG. 6.5*
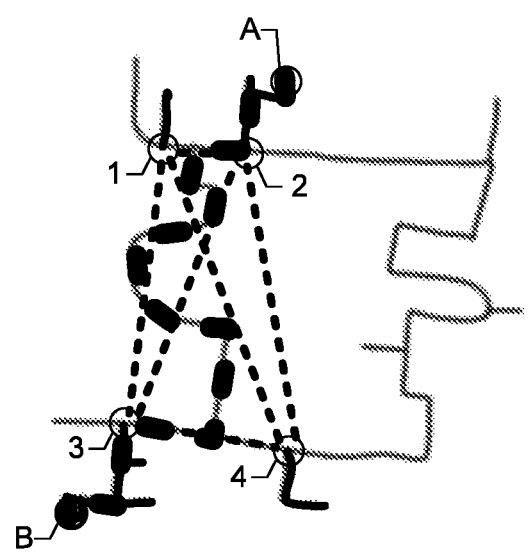
*FIG. 6.6*

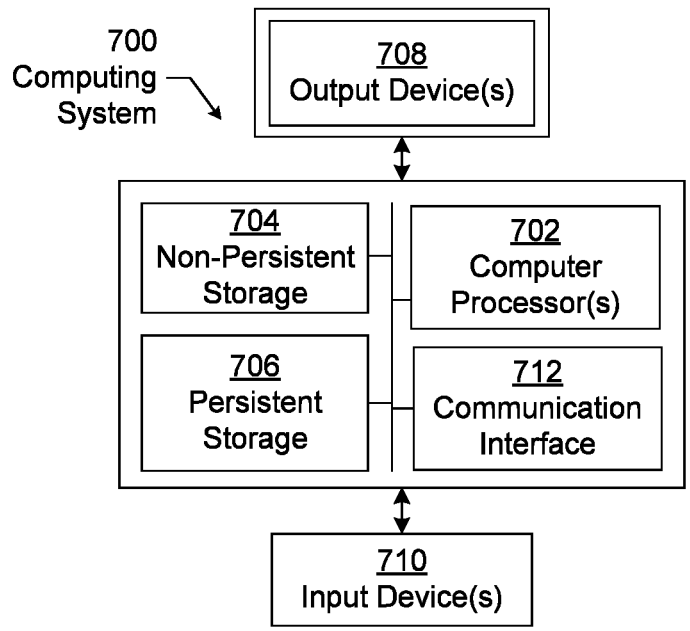
*FIG. 7.1*
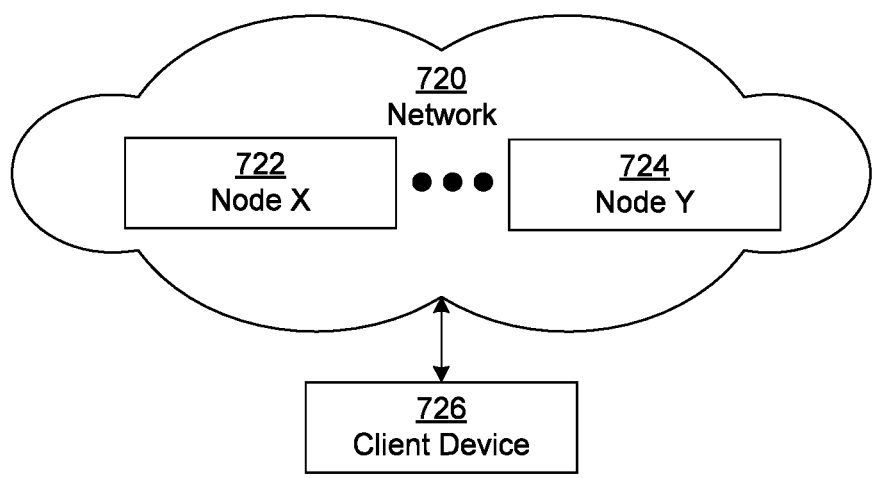
*FIG. 7.2*

SYSTEM FOR OFFSITE NAVIGATION

CROSS REFERENCE TO RELATED APPLICATIONS

This application claims priority to U.S. Provisional Patent Application No. 62/850,482 filed on May 20, 2019, entitled, "System for Offsite Navigation."

BACKGROUND

Various computer services offer digital maps and driving instructions on known public roads. In order to provide maps and driving instructions, the services rely on a single repository of geocoded road information. When a request is received for a route, the single repository of geocoded road information is searched to identify the path.

A problem exists in providing maps and navigation for routes that span public and private roads, such as rural company roads, roads of oil leases and other such unmapped roads. For example, oilfield companies may have challenges in obtaining navigation for routing that includes oilfield roads. Many private roads are constructed quickly and may be dirt or gravel roads which have changing conditions. As such, computer services that are focused on public roads do not provide routing for private routes.

SUMMARY

In general, in one aspect, one or more embodiments relate to a method that includes generating, by a navigation service, a route for navigating from a route origin to a route destination using a private roads repository. The method further includes identifying a ghost origin and a ghost destination of a ghost road along the route, sending, using an application programming interface of a base roads engine, a first request for a route from the ghost origin to the ghost destination, and receiving, from the base roads engine in response to the first request, a replacement section from the ghost origin to the ghost destination. The method further includes replacing, in the route, the ghost road with the replacement section to create an updated route and presenting the updated route.

Other aspects will be described below and with reference to the accompanying figures.

BRIEF DESCRIPTION OF DRAWINGS

FIG. 1.1 shows a diagram of a system in accordance with one or more embodiments.

FIG. 1.2 shows a software diagram of a system in accordance with one or more embodiments.

FIGS. 6.1, 6.2, 6.3, 6.4, 6.5, and 6.6 show an example in accordance with one or more embodiments.

FIGS. 7.1 and 7.2 show a computing system in accordance with one or more embodiments of the technology.

DETAILED DESCRIPTION

Figure 2:
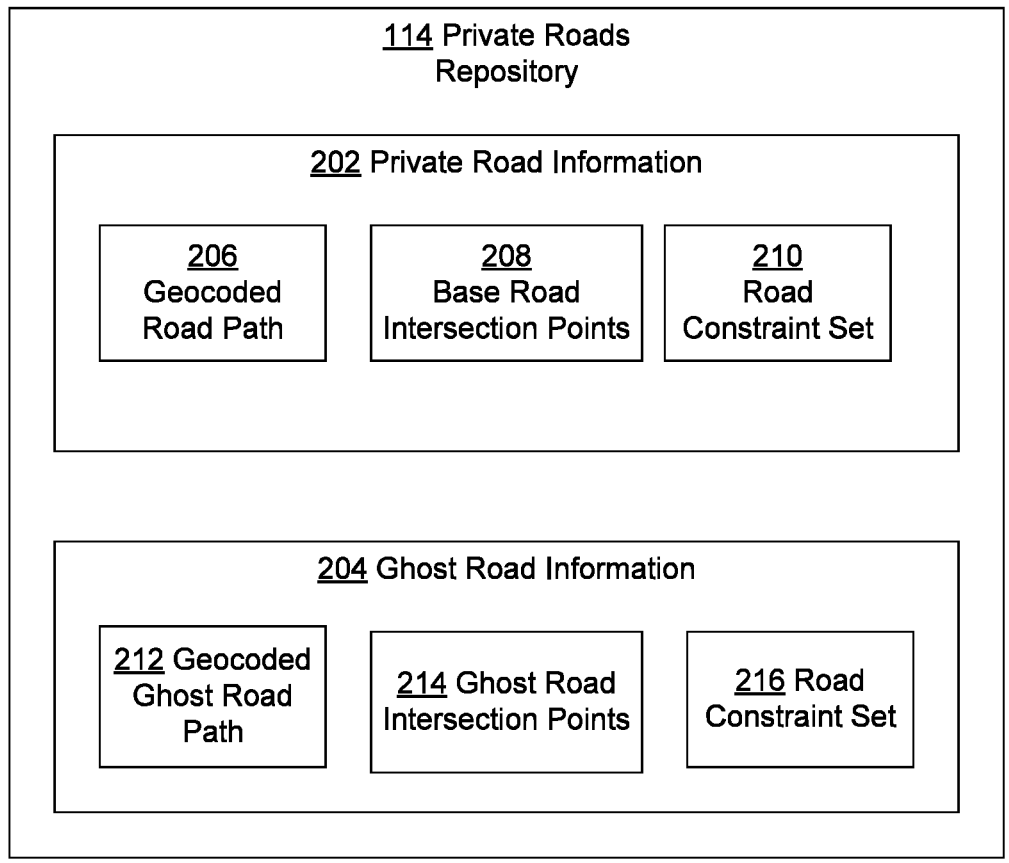
FIG. 2 shows a diagram of a private roads repository in accordance with one or more embodiments.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to route planning that includes both base and private roads. A base road may be a public road, semi-public road, a third-party private road, such as roads that have another entity maintain and expose a separate routing service, such as a third-party company. An example of base roads may be the roads of a public utility, a public road, or the roads of a different company.

Specifically, a private roads repository includes information about private roads and ghost roads. A ghost road is a proxy of a base road route formed from one or more base roads. One or more embodiments use the private roads repository to identify a route between two endpoints. The route includes one or more ghost roads. A ghost road is a road that does not exist and is a placeholder for another road or set of roads. Using an API call to a base roads service, the one or more ghost roads may be replaced in the route with the actual base roads. The resulting route may be presented.

In one or more embodiments, pluggable containers having databases and software are used to provide routing. Pluggable containers may independently operate to provide routing between a pair of locations. By using pluggable containers, different containers may be added to the system to expand functionality of the system and to customize the functionality. For example, if a user prefers a particular routing service for a geographic region, the particular routing service may be added via the container architecture. Further, if a geographic region is not covered by existing containers, different new containers may be added.

In one or more embodiments, at least one of the containers is a private roads container. Private roads are roads that are absent in the base roads. For example, private roads may be private because the roads are not widely publicly known outside of a geographic region. By way of an example, country dirt roads may be absent from public mapping services, such as GOOGLE MAPS™ mapping service, and therefore considered a private road with respect to such mapping services. As another example, private roads may be located on private lands. As such, private roads may be referred to as supplemental roads, because the listing the supplemental roads supplements the listing of the base roads on at least one mapping service.

The private roads container includes information and a routing service for private roads. One or more embodiments further provide various techniques for identifying roads and adding such roads to a private roads repository, such as through the use of tracking data, analysis of satellite images, and manual additions. One of the techniques is to use tracking data. For example, through cluster and linearization analysis on the tracking data, roads may be identified and added. Another technique is based on analysis of satellite and other images.

Turning now to FIG. 1.1, FIG. 1.1 shows a diagram of a system in accordance with one or more embodiments. As shown in FIG. 1.1, the system includes tracking devices (100), a base roads service (102), a maps computing system (104), and a network (106). Each of these components are described below.

Tracking devices (100) include software and/or hardware that include functionality to track vehicles on base and/or private roads. For example, the tracking devices may be geo-positioning system (GPS) devices located on the vehicles, user mobile devices, and other sources. The tracking devices may include functionality to track the location and speed of a vehicle. In one or more embodiments, tracking devices further includes functionality to store weights of vehicle.

A base roads service (102) is a service that is configured to provide navigation and routing for base roads. For example, the base roads service (102) may be a public roads service, such as GOOGLE MAPS™ mapping service, WAZE™ GPS-based geographical navigation application, APPLE® Maps, or other mapping application. The base roads service (102) includes a base roads repository (108), a base roads engine (110), and an API (112). The base roads engine is a data repository that stores information about base roads. The base roads engine (110) is software and/or hardware that is configured to provide mapping and navigation functionality for base roads. The base roads service (102) is accessible via the API (112). The API (112) is the interface by which other applications may request routing on base roads.

A maps computing system (104) is connected via a network (106) to the tracking devices (100) and the base roads service (102). The network (106) may be a mobile network, the Internet, or another network, such as described in reference to FIGS. 7.1 and 7.2. The maps computing system (104) includes a private roads repository (114), a navigation service (116), a constraint identification service (118), a road identification service (120), a user interface (122), and an API (124). Each of the components of the maps computing system (104) is described below.

The private roads repository (114) is any type of storage unit and/or device (e.g., a file system, database, collection of tables, or any other storage mechanism) for storing data. Further, the private roads repository (114) include multiple different storage units and/or devices. The multiple different storage units and/or devices may or may not be of the same type or located at the same physical site. The private roads repository (114) is described in further detail in FIG. 2.

Turning to FIG. 2, FIG. 2 shows a schematic diagram of the private roads repository (114) in accordance with one or more embodiments. As shown in FIG. 2, the private roads repository (114) includes private road information (202) for each stored private road and ghost road information (204) for each ghost road. An individual private road information (202) may exist for each stored private road and an individual ghost road information (204) may exist for each ghost road. A private road is an actual road that is located on typically unmapped geographic regions. For example, a private road may be located on private land, corporation land, a utility corridor, a road on an easement, or other such road. A private road, for example, may be a quickly constructed road, such as a dirt or gravel road. As another example, the private road may be a temporary road having a limited time span. The private road may have size, speed, and weight constraints.

A ghost road is a proxy road that represents connections between intersection points of private roads with base roads. In other words, the ghost road is a proxy for one or more base roads. The ghost road acts as a placeholder for the base roads. In one or more embodiments, any path of the ghost road includes at least a disjoint section from the ghost road. Thus, at least one road of the private road is different from a ghost road. Multiple routes between two intersection points that include one or more base roads may be represented by the same ghost road. For example, the ghost road may be a straight line between base roads.

Continuing with FIG. 2, private road information (202) includes a geocoded road path (206), base road intersection points (208), and a road constraint set (210). A geocoded road path (206) is a definition of a path of a private road using a coordinate system (e.g., longitude and latitude). The geocoded road path (206) identifies the route of the road geographically. The private road information (202) further includes base road intersection points (208). Base road intersection points are geolocations at which the private roads intersect base roads. A base road intersection point may be located at an endpoint of the base road, or in between endpoints of the base road (e.g., in the middle of the base road). The base road intersection point may be defined using a coordinate system. The road constraint set (210) is a set of constraints for a vehicle to use the private road. For example, the road constraint set (210) may be a maximum weight, a maximum or minimum size, speed, road angle constraints, or other constraint on vehicles using the road.

Similar to private road information, ghost road information (204) includes a geocoded road path (212), intersection points (214), and a road constraint set (216). The geocoded road path (206) is a definition of a path of the ghost road and may be in a coordinate system (e.g., longitude and latitude). Because the ghost road does not exist, the geocoding ghost road path does not follow an existing road or set of roads. For example, the geocoded ghost road path may be a straight-line path between base road intersection points of two private roads. The geocoding may be the same or similar to the private road geocoding. The intersection points are the locations at which the ghost road intersects a private road. The ghost road intersection points (214) may include the same set of points as the base road intersection points (202) for one or more base roads. In one or more embodiments, the intersection points are endpoints of the ghost road. The intersection points may be defined in a same or similar manner as the base road intersection point. The road constraint set (216) is a set of constraints for a vehicle to use the underlying base roads of the ghost road. For example, the speed constraint may be a function of the speeds of the routes of base roads. One function is to determine an average speed along each route and use the maximum of the averages as the maximum speed. Another function is an average speed. As another example, a preferred route may be predetermined, and the average speed of the preferred route may be used. The weight constraint may similarly be a function of the weight constraints of each route. The weight constraint may be the maximum weight across the various underlying base road routes, whereby the weight for each route is the lowest maximum weight for the roads on the route. The distance may be the minimum distance of the routes. Other functions may be used for the constraints without departing from the scope of the invention. As with the private roads, the road constraint set (216) may be a maximum weight, a maximum or minimum size, speed, road angle constraints, any hazardous material constraints, or other constraint on vehicles using the road.

Multiple ghost roads may exist with the same intersection points. Each ghost road may have a separate set of constraints. Thus, for example, if one road allows for construction vehicles and another road is for highway vehicles, both may be represented in the ghost road information.

Although FIG. 2 shows separate storage between ghost road information and private road information, the same storage structure may be used for both. Whether a particular road is a ghost road or private road may be defined, for example, using a flag stored in the road information.

Returning to the maps computing system of FIG. 1.1, a navigation service (116) is connected to the private roads repository (114). The navigation service (116) includes functionality to receive parameters of a route request and return a route matching the parameters. The parameters may include, for example, size of the vehicle, weight, a route origin, a route destination, and other information. The route origin is the starting location of the requested route. The route destination is the ending location of the requested route. The navigation service may perform the functionality of FIG. 3, described below.

The constraint identification service (118) includes functionality to obtain tracking data and validate the existence of one or more private roads. The constraint identification service (118) may further include functionality to determine a constraint set for one or more roads on the route based on the tracking information. Tracking information is information gathered by tracking particular vehicles. For example, tracking information may be a set of geocoded points. One or more of the geocoded points in the tracking information may be related in the tracking information with a timestamp identifying when the vehicle was located at the geocoded point. Tracking information may also include information about the particular vehicle, such a weight of load, type, class, and other information about the vehicle. Using the tracking information, the constraint identification service (118) is configured to generate statistics about vehicles traveling on the respective roads. From the statistics, the constraint identification service may extrapolate the respective road constraints of the private roads.

The road identification service (120) includes functionality to identify private roads based on images and tracking information. Specifically, the road identification service (120) is configured to identify new roads and validate existing roads. The road identification service (120) is further configured to generate ghost roads. The operations performed by the road identification service is described below in relation to FIGS. 4 and 5.

In one or more embodiments, the road identification service (120) includes an image recognition engine (126) and a tracking engine (128). The image recognition engine (126) is a tool that is configured to determine the location of roads from images, such as satellite images. In one or more embodiments, the image recognition engine (126) may be implemented as a neural network, such as a convolution neural network. In one or more embodiments, the image recognition engine (126) may be implemented as a set of rules that is based on color values of pixels in an image and/or color gradient. The tracking engine (128) includes functionality to determine the location of roads based on tracking information from vehicles traveling the roads. The tracking engine (128) may be implemented as a set of rules, clustering analysis algorithms, and/or linearization algorithms.

A user interface (122) and API (124) are communicatively connected (not shown) to the various components of the maps computing system (104). The user interface (122) and the API (124) are interfaces by which the functionality of the maps computing system may be obtained. In one or more embodiments, the user interface may be a graphical user interface, an audio interface, other interface, or have a combination thereof. For example, a driver or scheduler may request navigation from the navigation service using the user interface (122). As another example, the driver (122) may mark private roads and, optionally, base roads, in a map, using the user interface (122). Thus, the user interface (122) is configured to receive a request for navigation and present results of the navigation request. Similarly, the user interface (122) is configured to display a map of a region and receive information describing private roads in a region. The API (124) include similar functionality as the user interface (122) and exposes the functionality of the maps computing system (104) to other software components.

FIG. 1.2 shows a software architecture diagram (150) in accordance with one or more embodiments of the disclosure. The software architecture shown in FIG. 1.2 further describes FIG. 1.1 with respect to the container architecture and communication paths. The key (152) identifies the data flow and internal services requests/responses. As shown in FIG. 1.2, a frontend service (154) is connected to a routing service (156). The frontend service (154) includes the user interface (122) and the API (124) in FIG. 1.1 through which routing may be requested. The routing service (156) may be the navigation service (116) in FIG. 1.1.

Continuing with FIG. 1.2, the private roads container with private roads database and routing service (158) may be the private roads repository, road identification service, and constraint identification service in FIG. 1.1. The remaining containers in FIG. 1.2 may each include the same or similar components as the base roads service (102) in FIG. 1.1. For example, the remaining containers may at least include a roads repository, a roads engine and an API to request services of the container. The containers may include the base road container with the roads database and routing service (160).

Additional containers may also exist. For example, a multinational company may have an additional individual private roads service container (162) for each nation or geographic in which the multinational company operates. Similarly, additional base roads service container (164) may exist for different mapping services and/or for different geographic regions. Although only two additional containers are shown, the system may include any number of additional containers.

In the container architecture, different mapping services are accessible in separate containers. Each container maintains a distinct set of roads and routing service. The roads may be stored in heterogeneous formats between containers. Further, the containers may have different algorithms from other containers to create a route. When new containers are added, the routing service (156) is configured to use the API of the various containers to request a portion of the route. For example, a routing service may include a routing service API exposes the portion of the route regardless of the containers having the portion of the route. The routing services API may transmit a request to a container using the container's API. Thus, each container receives the request using the interface expected by the container.

The Persistent Volume Claim (PVC) abstraction layer is configured to add data for a container. To provide a location to store data and prevent data from being lost, persistent volumes may be created to store data outside of containers. The PVC is a mechanism to store the data.

While FIGS. 1.1, 1.2, and 2 shows a configuration of components, other configurations may be used without departing from the scope of the technology. For example, various components may be combined to create a single component. As another example, the functionality performed by a single component may be performed by two or more components.

Figure 3:
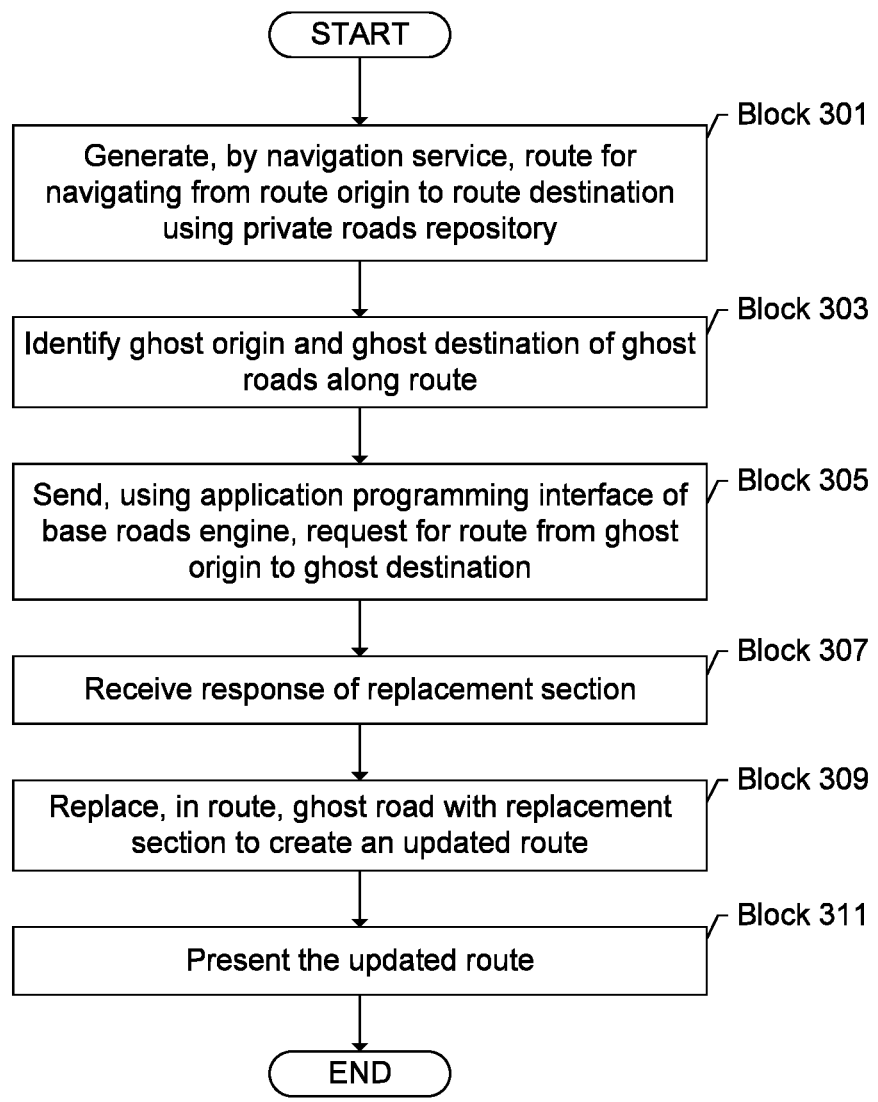
FIG. 3 shows a flowchart for generating a route in accordance with one or more embodiments.
Figure 4:
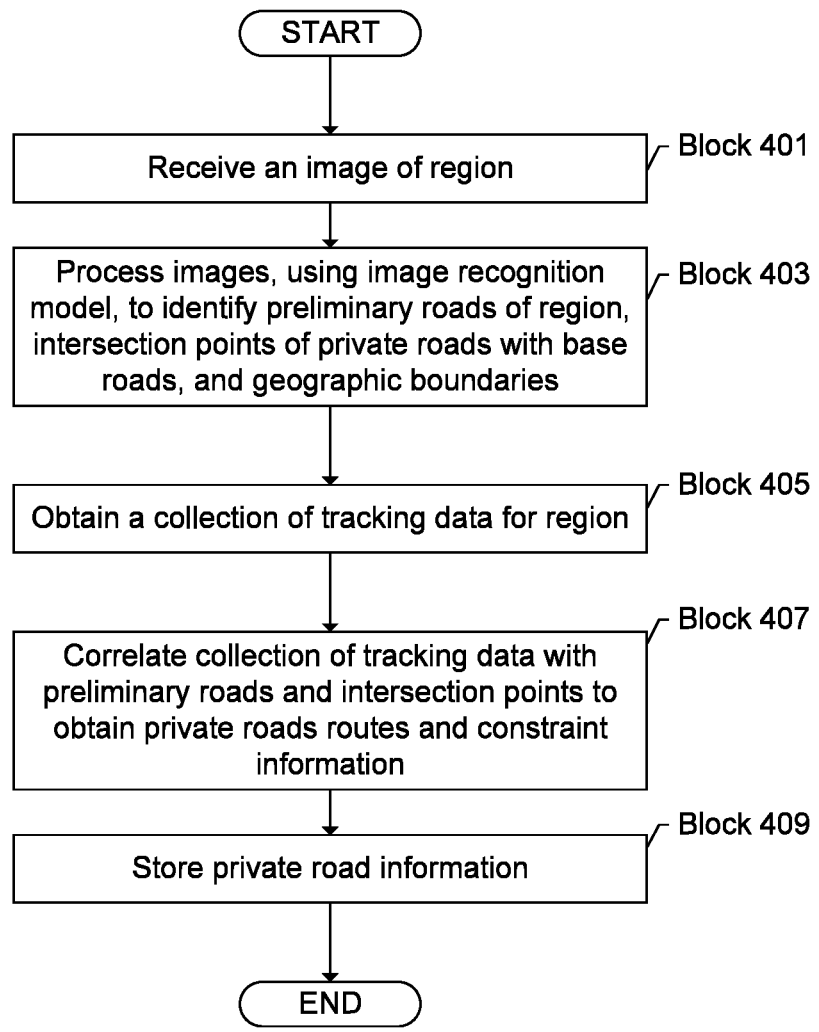
FIG. 4 shows a flowchart for adding private roads in accordance with one or more embodiments.
Figure 5:
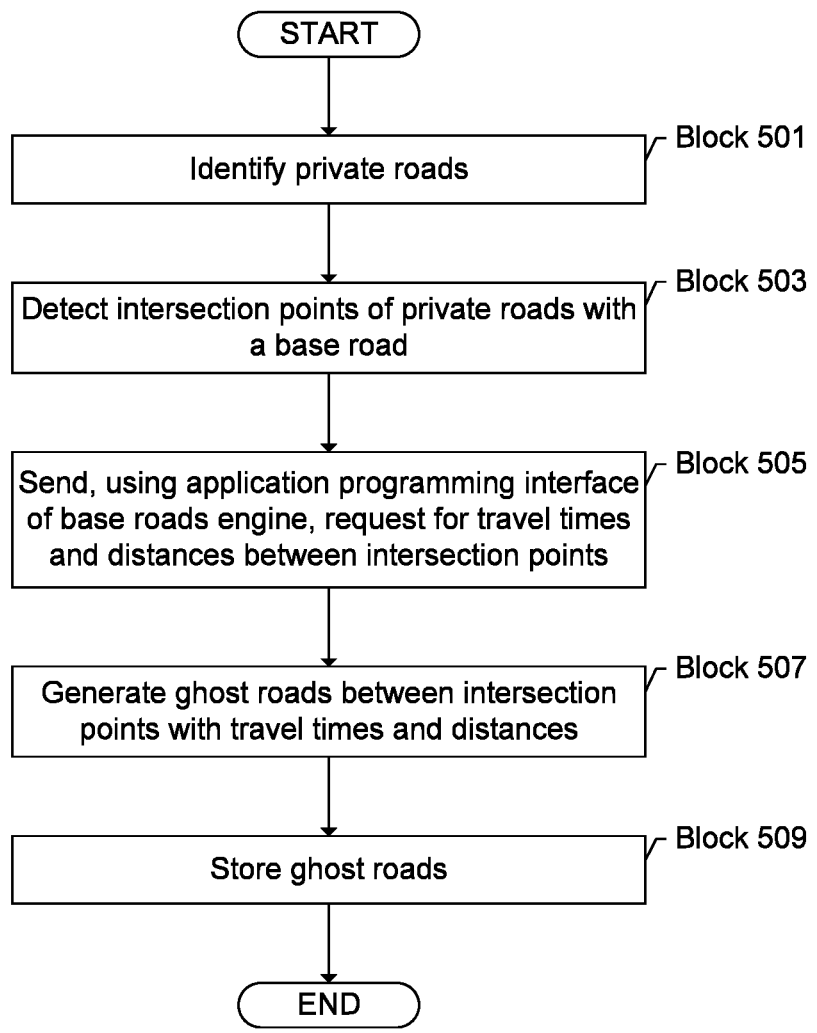
FIG. 5 shows a flowchart for adding ghost roads in accordance with one or more embodiments.

FIGS. 3-5 show flowcharts in accordance with one or more embodiments. While the various steps in this flowchart are presented and described sequentially, one of ordinary skill will appreciate that at least some blocks may be executed in different orders, may be combined or omitted, and at least some blocks may be executed in parallel. Furthermore, the blocks may be performed actively or passively. For example, some blocks may be performed using polling or be interrupt driven in accordance with one or more embodiments of the technology.

In Block 301, the navigation service generates a route for navigating from a route origin to a route destination using a private roads repository. Using the user interface or the API of the maps computing system, the navigation service receives a routing request that includes various parameters. The parameters in the route origin and the route destination. The route origin and/or route destination are locations that are on a base road or on a private road. If the route origin or route destination is a location on a base road, the location may be defined in the private roads repository (e.g., as a private road having a short length, such as a zero length, one foot length, length of a driveway or parking lot, etc.). For example, a limited number of locations may exist, such as company headquarters, house, locations of customers, or other locations may be stored as a private road. The parameters may include additional information about the vehicle being used, such as weight or weight class, size or size type, or other information. If the route request includes an intermediate stop location along the route, the routing request may be partitioned into two requests, whereby the route origin to the intermediate stop location as the route destination is a first request and the intermediate stop location as the route origin to the route destination is a second request.

Navigation from the route origin to the route destination may be performed using any algorithm known in the art or later defined. For example, a series of independent services may be used in order to fulfill a navigation request. First, names or addresses of the route origin and route destination are translated into geolocations using a geocoding service. The geolocations are then passed on to a directions service which provides a route and driving instructions. Finally, the route is displayed on top of graphical map loaded from a tiles service.

While performing the navigation of Block 301, the private roads repository is solely used for routing. Ghost roads are treated as actual roads when performing the routing. Thus, navigation proceeds across private and ghost roads without consideration of whether the road is a ghost road or an actual private road. By using ghost roads, one or more embodiments do not need to track traffic information on base roads, track road construction on base roads, or maintain information about base roads. Because base roads include public roads and because the base road network is generally several orders of magnitude larger than the private roads of a company, the use of ghost roads means that the maps computing system may disregard the route on the base roads.

In Block 303, a ghost origin and a ghost destination of ghost roads along the route are identified. After the route is determined, the ghost roads along the route are identified. For example, the navigation service may iterate through the roads along the route to determine whether the road information for the corresponding road denotes the road as a ghost road. For any road denoted as a ghost road, the ghost origin of the ghost road and the ghost destination of the ghost road is identified. The ghost origin and the ghost destination are locations at which a private road intersects a base road. Thus, the ghost origin and ghost destination correspond to locations on a base road as well as on a private road. In one or more embodiments, when ghost roads are incorporated into the route, the travel time and distance for the ghost road are used. As described above, the travel time and distance are generated for a ghost road based on statistics gathered from the base roads that may be used for the ghost roads. Because the underlying base roads or conditions thereof may change without notification, the statistics is an estimation of the distance and travel time.

In Block 305, using the API of the base roads engine, a request for a route is sent from the ghost origin to the ghost destination. The navigation service issues the request to specify the ghost origin as the origin of the requested route and the ghost destination as the destination of the requested route. In other words, the base roads service is not notified that the requested route is an intermediary route. Moreover, the base road service does not need to use the information about the requested route being an intermediary route. The base road engine uses the base road repository to determine a route from the requested origin to the requested destination. The request to the base road service may further include one or more of the parameters, such as weight class, and other parameters that was received in the request in Block 303.

In Block 307, a response is received from the base roads engine where the response includes a replacement section. To the base roads service, the response is a complete route from the origin (i.e., ghost origin) to the destination (i.e., ghost destination) and is returned via the API of the base roads service. To the navigation service, the response is the section.

In Block 309, in the route, the ghost road is replaced with the replacement section to create an updated route. In other words, the navigation service plugs the route received in Block 307 into the portion of the route generated in Block 303 that corresponds to a ghost road. The process of Blocks 305, 307, and 309 may be performed for each ghost road along the route. The result of performing Blocks 303-309 is a route that spans both base and private roads.

In one or more embodiments, multiple alternative routes spanning base and private roads may be created using the Blocks 303-309. The number of routes may be limited in order to comply with computing resource constraints. The various alternative routes may be compared after Block 309 to select a route having minimal travel time or other objective.

In Block 311, the updated route is presented in accordance with one or more embodiments. For example, the updated route may be transmitted to a requesting computing system, graphical user interface, displayed, played, or otherwise presented to the user or application requesting the route.

By way of an example, a route may be from an origin of a company to a wellsite on a private road. The parking lot of the company may be maintained in the private roads database as a private road. The route may include the parking lot of the company through public roads, to private roads, then along roads of a third-party company, followed by roads of the private company. The portion of the route along the public roads and the portion of the route along the third-party roads may each be represented as a ghost road in the private roads repository. By querying the respective containers, the ghost roads may be replaced with the corresponding actual base roads. Thus, a complete route is created and returned to the user.

As described above, one or more embodiments provide a technique for combining private roads with base roads. Various techniques may be performed to identify private roads in accordance with one or more embodiments. In Block 401, an image of a region is received. In one or more embodiments, satellite images of one or more regions is obtained. The satellite images may include metadata identifying the region and the scale of the images.

In Block 403, the images are processed using an image recognition model, to identify preliminary roads of a region, intersection points of private roads with base roads, and geographic boundaries. The processing of images may be performed based on the color value and gradients in the images. Specifically, each image is composed of pixels, where each pixel has a color. Neighboring pixels, whose color is within a threshold degree of variability of each other, may be marked as contiguous section (i.e., section in the discussion below). Depending on the scale and resolution of the image, if two or more contiguous sections are divided by only a threshold number of pixels, then the two or more contiguous sections may be combined because the pixels in between the two contiguous sections may be deemed to be erroneous. Color gradients may be used to denote geographic boundaries in the image. Specifically, a boundary between sections may be identified based on neighboring contiguous sections having a large color gradient between the sections (e.g., one section being substantially green and the other section being substantially tan).

External information, such as the composition of private roads (e.g., gravel, dirt, tar, concrete etc.) may be further used to identify private roads. For example, if the roads are gravel or concrete, then white or light pixels may be identified as possible roads. As another example, if the roads are dirt, then tan pixels may be identified as possible roads. Further, sections that are substantially green or private may be marked as not corresponding to a road. Likewise, if the private roads are dirt roads, then black may be identified as a geographic boundary, such as a fence, utility line, equipment, pipeline, or other non-road. For geographic boundaries, the image may be processed to identify crossing points in which a preliminary road crosses the geographic boundary.

The shape of the sections in the image may be used to identify various roads. For example, sections having at least a threshold length and between a minimum and maximum width may be identified as road. Because roads may terminate in a parking lot or intersect a parking lot, if a section intercepts a larger section, the larger section may be identified as a parking lot.

In some embodiments, a base map of the region is requested from the base roads service. The base map of the region is overlaid onto the image of the region to identify intersection points between base and private roads. Specifically, where a base road intersects from the base map has a same geographic location, or within a threshold distance, as a location along a preliminary private road, an intersection point for the preliminary private road may be identified. The intersection point may be in the middle of the base road or at an endpoint of the base road.

In some embodiments, from the image processing, based on the color and width of a preliminary private road, a preliminary constraint set may be determined for the private road. For example, the larger width may denote larger weight limits and size of vehicles, whereas a smaller width may denote a small weight limit. Similarly, color may be indicative of composition of the road, which has a maximum weight.

In Block 405, a collection of tracking data for a region is obtained. As vehicles travel along various roads in a region, the tracking devices on the vehicles record tracking information. The tracking information may include the path of the vehicle, speed, and information about the vehicle, such as the make and model, weight, load, and other information. The information is transmitted, such as via the network, to the maps computing system periodically, in real-time, upon request, etc.

In Block 407, the collection of tracking data is correlated with preliminary roads and intersection points to obtain private roads routes and constraint information. For example, if the paths of one or more vehicles, or a threshold number thereof, substantially is along a preliminary road, the preliminary road may be marked as a validated private road and stored in the private roads repository. In contrast, if the path of no vehicle is along a private road for a certain duration of time, the private road may be marked as destroyed, non-existent, or not validated.

If a threshold number of vehicles travel along a path that does not correspond to a preliminary road or a base road, a new private road may be identified. Because paths of vehicles are not strictly linear, processing paths of vehicles to identify roads may include grouping paths that are substantially adjacent and collinear.

Similarly, where the tracking information shows a vehicle transitioning from a preliminary private road to a base road on the base roads map, an intersection point is identified. As such, intersection points may be identified and/or validated.

Statistics about the vehicle and speed may be gathered and used to identify the constraint set for the vehicle and the private roads. Further, information about the length of time that a vehicle is stationary may be used to identify possible origins and/or destinations to mark along a private road.

Although not shown, users may validate and/or provide information about private roads in the private roads repository using the user interface.

Rather than or in addition to correlating tracking data with preliminary roads and intersection points, tracking data may be used directly to identify private roads as follows. The tracking data may include beacon information of a vehicle. The beacon information may identify a set of geolocations with corresponding timestamps. For example, a beacon may be recorded each 15 seconds with a timestamp identifying when vehicle was at the location.

A cluster analysis may be performed on the set of beacons in each segment of a geographic region to create a set of cluster centers. Logical transformations are performed to link cluster centers together. The linkage is performed based on adjacency of timestamps of beacons, the adjacency between beacons of different clusters. Distances between centroids of a cluster may be based on new roads and/or flawed location information (e.g., inaccuracies between readings). While computing clusters, the maximum distance of beacons from each cluster centroid is determined. The maximum distance may be used to detect whether if new traces from the system result in new roads that need to be drawn on the map. For example, new roads may be indicated when multiple beacons are away from a cluster centroid. To figure out the new road, the bacons are not within a threshold distance to cluster centroids are filtered out and separately clusters. A new road is created along a path along the cluster centroid. Smoothing may be performed to make the road more linear. With an increase in the number of clusters, more and more fine-grained information about the road and more linear representation of a road is created.

Using the operations of FIG. 4, new roads may be quickly added to the private roads data repository. For example, dirt and gravel roads are often built quickly. When private roads include dirt roads, the private roads network may change week by week. One or more embodiments create a seamless way to add to the private road data repository quickly and when the private roads are first used.

In Block 409, the private roads information is stored. In particular, the private roads information is stored in the private roads repository. For example, the various preliminary and validated roads may be geocoded and stored.

FIG. 5 shows a flowchart for adding ghost roads to the private roads repository. In Block 501, private roads are identified. In Block 503, intersection points of private roads with base roads are identified. Identifying private roads and intersection points may be performed as described above with reference to FIG. 4. In particular, where the coordinates of the private road are at least within a threshold distance of the coordinates of a base road, an intersection point may be identified. In some embodiments, if the coordinates are separated by an identified geographic boundary, then no intersection point is identified.

In Block 505, using the API of the base roads engine, a request for travel times and distances is sent to the base roads engine. In one or more embodiments, pairs of intersection points are generated, each pair corresponds to a ghost origin and a ghost destination for a ghost road. In some embodiments, the identified pairs are a cartesian product of the set of intersection points with itself. In some embodiments, the generated pairs may be filtered to remove unlikely combinations, such as being within a threshold distance along a single private road, being partitioned by a section spanned only by private roads, etc. In some embodiments, pairs are generated based on being likely combinations.

For each generated pair of intersection points, a request is sent to the base roads service. The request may be sent in a same or similar manner as the request in Block 305. In particular, the first intersection point in the pair may be the requested route origin and the second intersection point may be the requested route destination. The API of the base roads service may return distances and travel times, with or without the actual route, for one or more routes from the first intersection point to the second intersection point. Statistics from the resulting distances and travel times of various one or more returned routes, along with any other constraints are combined to determine a distance and travel time for the ghost road along with other constraints for the ghost road.

In Block 507, ghost roads between intersection points with travel times and distances. For each pair of intersection points a single ghost road is generated. The path of the underlying route or routes is immaterial to the path of the ghost road. For example, the geocoded path of the ghost road may be a straight line between the intersection points. The distance and travel time are generated based on a statistic. Further, other constraints about routes may be combined to create a single constraint set for the ghost road.

In Block 509, the ghost road is stored. Storing the ghost road may be performed in a similar manner as storing the private road, as described above with reference to FIG. 4.

FIGS. 6.1-6.5 shows an example in accordance with one or more embodiments of the technology. The following example is for explanatory purposes only and not intended to limit the scope of the technology.

Geocoding may be performed by both base service and private information. For example, base geocoding is done by different services such as Google Places. Many governmental regulations for different states in United States mandates that well and every well permit are reported to government database. The government database of well locations may be augmented with existing geocoding from Google places API and receive the combination of "Base"+"Oilfield" locations. The data may further be augmented with private databases of geocoded location information. The databases are replaceable and usable in a sense of easiness of application, it should be replaceable and callable from one generalized service. Thus, different databases may be used for geocoding for different regions.

Another component is having a private roads data repository of available roads for driving. The private roads data repository may include roads from different data sources. As a previous example with the various locations databases, the roads databases may be generalizable, interchangeable and infinitely scalable. For example, the private roads repository may include identified roads from various sources, user validated, and crowdsourced roads.

FIGS. 6.1-6.5 shows an example in accordance with one or more embodiments of the technology. Turning to FIG. 6.1, FIG. 6.1 shows a map having base roads (denoted with thinner lines) from a base roads repository and private roads (denoted with thick black lines) from a private roads repository. The base roads service provides a Directions API for the base roads.

By studying satellite photos, GPS breadcrumbs and other data sources, the missing roads (i.e., private roads are identified). When the private roads are added to the private roads repository, base road intersection points are marked on the private roads. The base roads intersection points are marked as points 1, 2, 3, and 4 in FIG. 6.2. below. The four intersection points are referred to as four points base road intersection points.

Note that the private roads and base roads are stored in separate, independent data repositories.

Next one or more embodiments iterate the combinations of base road intersection points and use the base service to calculate the travel time and distance for each pair shown as dotted lines in FIG. 6.3. The values are saved as a set of ghost roads in the private roads repository, and the travel times and distances are assigned to the ghost roads. Because of one-way roads and other constraints, order is maintained. Thus, the travel time from 1 to 2 may not be the same as from 2 to 1. Thus, the private roads repository includes the time and distance it to travel between any pair of base road intersection points.

Running the script that builds ghost roads between every combination of base road intersection points engages into an n*(n−1) loop through the base road intersection points and query the directions for every combination of base road intersection points. Each combination is saved as a straight road as a ghost road in the private road database with the correct time/distance/routing value. The dashed lines of FIG. 6.3 are the ghost roads. Since a combination of n(n−1) base road intersection points pairs are created, the system is scalable is if decomposed, solved in chunks and rebuilt with connecting the base road intersection points on polygon connections.

Next, consider the scenario in which the navigation service is called. For the navigation service, the navigation service may include 1. Creating a path; 2. Validating the drivability of the path; 3. Optimization of the route based on drivability and ETA.

To create a path, depending on a number of containers involved in route creation and geospatial locations of roads algorithm might have slight modifications in logics. For the purposes of an example, consider that two data repositories exist (i.e., the base roads repository; and the private roads repository).

The data structure is used to calculate routes, ETAs, distance, time etc. Turning to FIG. 6.4, consider the scenario in which the route origin is selected as A and the route destination is B. The private roads repository may be used to calculate the optimal path according to the weighting selected. For example, the private roads repository may calculate the thick dotted path in FIG. 6.5. Next, the thick dotted path is traversed to identify road segments that are actually a ghost road and not a private road. The base roads service is queried using the base road intersection points (i.e., point 2 and point 3) at either end of the ghost road as the origin and destination.

The resulting section is substituted into the route to replace the ghost road as shown in FIG. 6.6. The thick dotted path in FIG. 6.6 shows the resulting route that is presented.

In one or more embodiments, the interface may have the following to serve a directions request. When handling a 'directions' request, several scenarios may exist that use different approaches. The first is to identify whether the start and/or destination is on a private road or on a base road.

The following are example scenarios to address. In the first scenario, both start and destination are on private road segments. In such a scenario, the private roads repository may be used to get the complete route. The complete route is traversed, and any road segment found is marked as 'ghost road'. The segments are substituted with requests to the base service.

A second scenario is that both the start and destination are on base roads. In such a scenario, the directions only from the base service may be queried and only the base roads repository may be used. This implies that the algorithm will not utilize potential shortcuts from the private roads repository.

A third scenario exists when an endpoint is on base road, and the other endpoint is on private road. In such a scenario, a route from the private endpoint to a 'reasonable' base road intersection point is identified. For example, N nearest base road intersection points using basic straight-line distance. Based on the nearest intersection points, actual routing cost from endpoint to the intersection points are calculated and the optimal route is selected. The optimal base road intersection point may be selected based on the route between the endpoint and the base road intersection points can lead to a sub-optimal overall route.

Another technique when at least one endpoint is on a base road is to have the endpoint stored as a small private road, and just an intersection point. Such technique may be used, for example, when the endpoint is used with a threshold frequency as an endpoint to a route.

In some embodiments, drivability of private roads is validated. Tracking information of the shipments of vehicles driven any location in the world may be stored. The tracking information may include 1. Type of vehicle (light or heavy)—gives the size of the road and applicability for the user's vehicle; 2. Average driving speed.—used to estimate ETA of any given shipment; 3. Direction of the driving.—used to determine one way or two-way roads. Note: the fact of slowdown at particular location when two vehicles meet indicates a narrow road. Other tracking information may be stored.

For example, a plurality of the predictors such as weight of the load, type of the load, season and day/time driven, experience of the driver, age, gender etc. can be used to classify drivability and weight the level of confidence for the road suggestion engine.

The route may be optimized based on drivability and estimated time of arrival. From average driving speed, ETA may be estimated. A machine learning algorithm that uses the predictors such as weight of the load, type of the load, season and day/time driven, experience of the driver, age, gender etc. can be used to predict estimated time of arrival and give uncertainty ranges according to the algorithm. Usage of the ETA will increase confidence in shipment and operations planning.

Tile component is a visual representation of the map and front end for the routing algorithm.

An example use of the application is an oilfield route suggestion.

However, the concept is generalizable for any given place/technology in the world. Such industries include Oilfield, Agriculture, Mining, National parks etc. as an API. Having a reliable API/service to produce ETAs and driving instructions across previously unmapped road networks will enable a series of dependent systems around logistics planning, resource optimization and obviously self-driving trucks.

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 7.1, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the technology.

The computing system (700) in FIG. 7.1 may be connected to or be a part of a network. For example, as shown in FIG. 7.2, the network (720) may include multiple nodes (e.g., node X (722), node Y (724)). Each node may correspond to a computing system, such as the computing system shown in FIG. 7.1, or a group of nodes combined may correspond to the computing system shown in FIG. 7.1. By way of an example, embodiments of the technology may be implemented on a node of a distributed system that is connected to other nodes. By way of another example, embodiments of the technology may be implemented on a distributed computing system having multiple nodes, where each portion of the technology may be located on a different node within the distributed computing system. Further, one or more elements of the aforementioned computing system (700) may be located at a remote location and connected to the other elements over a network.

Although not shown in FIG. 7.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7.1. Further, the client device (726) may include and/or perform all or a portion of one or more embodiments of the technology.

The computing system or group of computing systems described in FIGS. 7.1 and 7.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the technology. The processes may be part of the same or different application and may execute on the same or different computing system.

Rather than or in addition to sharing data between processes, the computing system performing one or more embodiments of the technology may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the technology, may extract one or more data items from the obtained data. For example, the extraction may be performed as follows by the computing system in FIG. 7.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7.1, while performing one or more embodiments of the technology, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., A−B), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the technology, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 7.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 7.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 7.1 and the nodes and/or client device in FIG. 7.2. Other functions may be performed using one or more embodiments of the technology.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method comprising:
   generating, by a navigation service, a route for navigating from a route origin to a route destination using a private roads repository of a first container, wherein the first container further comprises a first application programming interface (API), and wherein private roads in the private roads repository comprise a first data format;
   identifying a ghost origin and a ghost destination of a ghost road along the route,
      wherein the ghost road comprises a proxy of a base road route formed from one or more base roads stored in a base roads repository of a second container, the second container further comprising a base roads engine and a second API;
   sending, using the second API, a first request for a route from the ghost origin to the ghost destination;
   receiving, from the second API of the second container of the base roads engine, and in response to the first request, a replacement section from the ghost origin to the ghost destination,
      wherein the base roads engine routes over public roads, and
      wherein the base roads stored in the base roads repository comprise a second data format heterogeneous to the first data format;
   replacing, in the route, the ghost road with the replacement section to create an updated route, wherein the replacement section is obtained via the second API; and
   presenting the updated route.

2. The method of claim 1, further comprising:
   identifying a plurality of geocoded road paths;
   detecting a plurality of intersection points of the geocoded road paths with at least one base road;
   sending, using the second API, a second request for a travel time and a distance from a first intersection point of the plurality of intersection points to a second intersection point of the plurality of intersection points;
   receiving, from the base roads engine in response to the second request, the travel time and the distance;
   generating the ghost road between the first intersection point and the second intersection point; and
   storing the travel time and the distance with the ghost road.

3. The method of claim 2, wherein the ghost road is stored as a direct line from the first intersection point to the second intersection point.

4. The method of claim 2, wherein the ghost road is generated to have a different path from any path returned by the base roads engine from the first intersection point to the second intersection point.

5. The method of claim 2, further comprising:
   determining a plurality of pairs of the plurality of intersection points;
   generating, for each of the plurality of pairs, a plurality of ghost roads; and
   storing the plurality of ghost roads.

6. The method of claim 1, further comprising:
   obtaining tracking data from a plurality of vehicles;
   relating a portion of the tracking data to a private road based on positional information in the tracking data;
   determining a road constraint set for the private road from the portion; and
   storing the road constraint set with the private road.

7. The method of claim 6, further comprising:
   extracting a plurality of weights of vehicles from the portion of tracking data; and
   extrapolating a maximum weight for the private road from the plurality of weights.

8. The method of claim 1, further comprising:
   obtaining tracking data from a plurality of vehicles, the tracking data comprising a plurality of beacon information, wherein the plurality of beacon information comprise sets of geolocations with corresponding timestamps, of the plurality of vehicles;
   performing a first cluster analysis on the tracking data to create a first plurality of cluster centroids;
   performing a second cluster analysis on a subset of the plurality of beacon information when the subset of the plurality of beacon information satisfies a threshold distance to the first plurality of cluster centroids, the second cluster analysis resulting a second plurality of cluster centroids;
   connecting the second plurality of cluster centroids to create a new private road; and
   storing the new private road.

9. A system comprising:
   a first container comprising a private roads repository and a first application programming interface (API), wherein the private roads repository stores a plurality of private roads and a ghost road, and wherein the plurality of private roads comprise a first data format;
   at least one computer processor executing a navigation service operatively connected to the private roads repository, the navigation service for causing the at least one computer processor to perform operations comprising:

generating a route for navigating from a route origin to a route destination using the private roads repository;
identifying a ghost origin and a ghost destination of a ghost road along the route,
wherein the ghost road comprises a proxy of a base road route formed from one or more base roads stored in a base roads repository of a second container, the second container further comprising a base roads engine and a second API;
sending, using the second API, a first request for a route from the ghost origin to the ghost destination;
receiving, from the second API of the second container of the base roads engine, and in response to the first request, a replacement section from the ghost origin to the ghost destination,
wherein the base roads engine routes over public roads, and
wherein the base roads stored in the base roads repository comprise a second data format heterogeneous to the first data format;
replacing, in the route, the ghost road with the replacement section to create an updated route, wherein the replacement section is obtained via the second API; and
presenting the updated route.

10. The system of claim 9, wherein the at least one computer processor is further configured to execute a road identification service for causing the at least one computer processor to perform operations comprising:
identifying a plurality of geocoded road paths,
detecting a plurality of intersection points of the geocoded road paths with at least one base road,
sending, using the second API of the base roads engine, a second request for a travel time and a distance from a first intersection point of the plurality of intersection points to a second intersection point of the plurality of intersection points,
receiving, from the base roads engine in response to the second request, the travel time and the distance,
generating the ghost road between the first intersection point and the second intersection point, and
storing the travel time and the distance with the ghost road.

11. The system of claim 9, wherein the operations further comprise:
identifying a plurality of geocoded road paths;
detecting a plurality of intersection points of the geocoded road paths with at least one base road;
determining a plurality of pairs of the plurality of intersection points;
generating, for each of the plurality of pairs, a plurality of ghost roads; and
storing the plurality of ghost roads.

12. The system of claim 9, wherein the operations further comprise:
obtaining tracking data from a plurality of vehicles;
relating a portion of the tracking data to a private road based on positional information in the tracking data;
determining a road constraint set for the private road from the portion; and
storing the road constraint set with the private road.

13. The system of claim 9, wherein the operations further comprise:
obtaining tracking data from a plurality of vehicles, the tracking data comprising a plurality of beacon information, wherein the plurality of beacon information comprise sets of geolocations with corresponding timestamps, of the plurality of vehicles;
performing a first cluster analysis on the tracking data to create a first plurality of cluster centroids;
performing a second cluster analysis on a subset of the plurality of beacon information when the subset of the plurality of beacon information satisfies a threshold distance to the first plurality of cluster centroids, the second cluster analysis resulting a second plurality of cluster centroids;
connecting the second plurality of cluster centroids to create a new private road; and
storing the new private road.

14. The system of claim 13, wherein the operations further comprise:
extracting a plurality of weights of vehicles from at least a portion of the tracking data; and
extrapolating a maximum weight for the new private road from the plurality of weights.

15. A non-transitory computer-readable storage medium storing a computer program product comprising computer readable program code that causes a computer system to perform operations comprising:
generating, by a navigation service, a route for navigating from a route origin to a route destination using a private roads repository of a first container, wherein the first container further comprises a first application programming interface (API), and
wherein private roads in the private roads repository comprise a first data format;
identifying a ghost origin and a ghost destination of a ghost road along the route,
wherein the ghost road comprises a proxy of a base road route formed from one or more base roads stored in a base roads repository of a second container, the second container further comprising a base roads engine and a second API;
sending, using the second API a first request for a route from the ghost origin to the ghost destination;
receiving, from the second API of the second container of the base roads engine, and in response to the first request, a replacement section from the ghost origin to the ghost destination,
wherein the base roads engine routes over public roads, and
wherein the base roads stored in the base roads repository comprise a second data format heterogeneous to the first data format;
replacing, in the route, the ghost road with the replacement section to create an updated route, wherein the replacement section is obtained via the second API; and
presenting the updated route.

* * * * *